Figure 1:
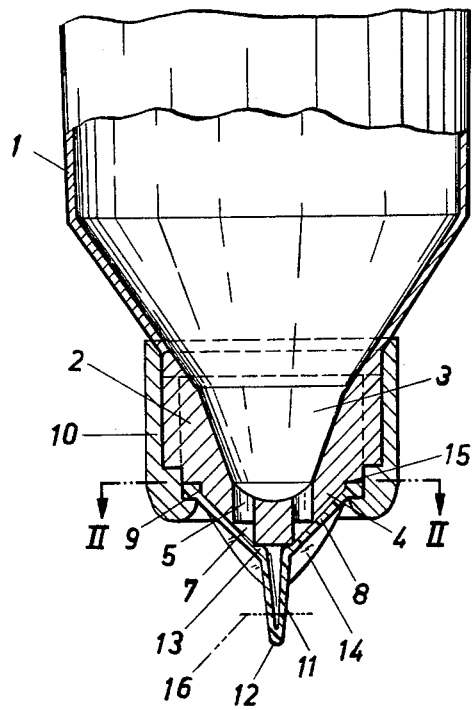

Aug. 31, 1965 G. E. V. BENSON 3,203,603
CLOSING DEVICE FOR CONTAINERS FILLED WITH PASTES OR LIQUIDS
Filed Jan. 17, 1964 5 Sheets-Sheet 1

INVENTOR.
Gustav E. V. Benson
BY
*signature*
agent

Aug. 31, 1965   G. E. V. BENSON   3,203,603
CLOSING DEVICE FOR CONTAINERS FILLED WITH PASTES OR LIQUIDS
Filed Jan. 17, 1964   5 Sheets-Sheet 2
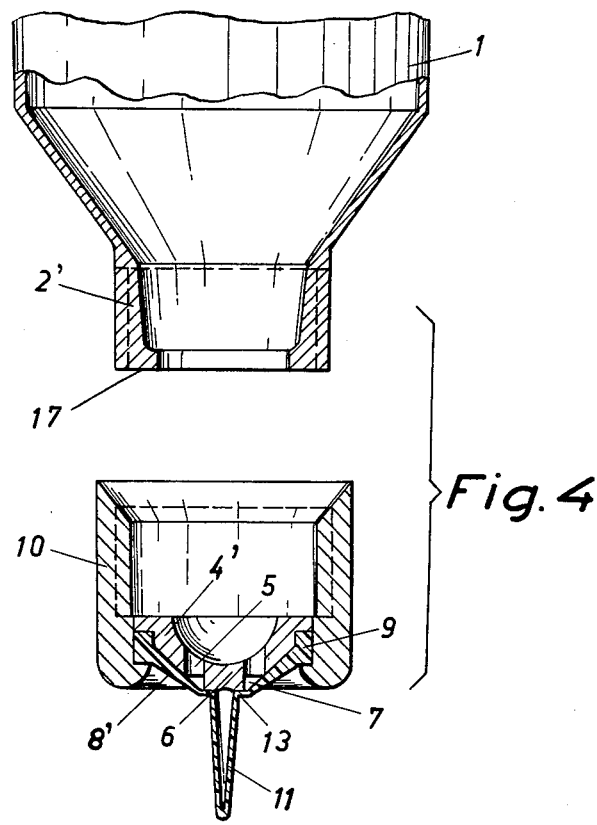
Fig. 4
Fig. 5
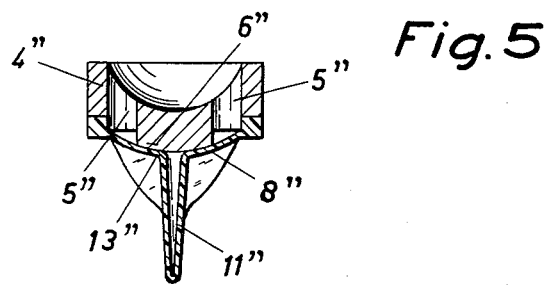
INVENTOR.
Gustav E.V. Benson
BY
F. H. Jenkins
Agent

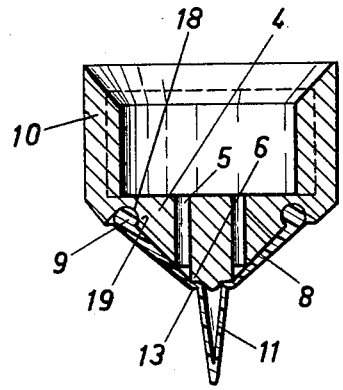
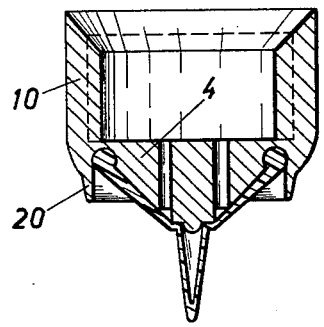
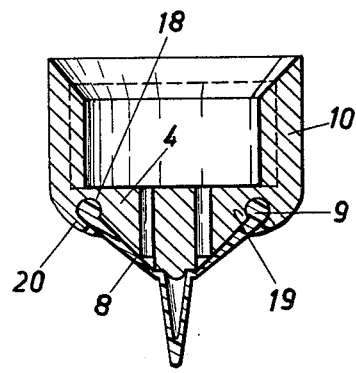

INVENTOR.
Gustav E.V. Benson
BY
J.R. Jenkins
Agent

Aug. 31, 1965     G. E. V. BENSON     3,203,603
CLOSING DEVICE FOR CONTAINERS FILLED WITH PASTES OR LIQUIDS
Filed Jan. 17, 1964     5 Sheets-Sheet 5

INVENTOR.
Gustav E.V. Benson
BY

United States Patent Office

3,203,603
Patented Aug. 31, 1965

3,203,603
CLOSING DEVICE FOR CONTAINERS FILLED
WITH PASTES OR LIQUIDS
Gustav Eric Valdemar Benson, Stortorget 13,
Malmö, Sweden
Filed Jan. 17, 1964, Ser. No. 338,440
Claims priority, application Sweden, Jan. 19, 1963,
609/63; Mar. 14, 1963, 2,772/63
8 Claims. (Cl. 222—494)

This invention has reference to a closing device for containers filled with pastes or liquids, said device having a seat or false cap provided with passage channels extending over the container mouth, and further having a membrane of an elastic material arranged axially outside said seat and disposed tight against the same at a base portion secured liquid-tight on the container around the container mouth and adapted normally to rest tightening against the seat in an annular zone of the membrane situated substantially radially inwardly from said passage channels so as, in dependence of a certain feeding pressure acting upon the contents of the container by means of an elastic deformation, to loosen the tightening contact with said seat in said annular zone of the membrane and thereby to uncover the outer ends of the passage channels of said seat.

The main feature of the invention is that the membrane at its base portion is permanently attached or sealed to the seat radially outside the passage channels and that the membrane axially outside the passage channels is formed with a closed beak adapted to be cut off transversely so as to render possible the pressing out of the contents in the container. The invention is used with advantage on a tube having an elastic wall, e.g. plastic tubes, because of the tendency of the elastic tube wall to return to normal position after it has been squeezed and consequent likelihood of air being sucked back into the tube.

Such a membrane which preferably comprises rubber, gives a simple and absolute closure. The pressure required on the outside of the tube for opening may be determined by a choice of the diameter of the passage channels in the seat against which the membrane rests resiliently as well as by a choice of the cross section of the membrane beak and further by the choice of the thickness of the membrane situated between the beak and the base portion of the membrane. These possibilities of modifications in the dimensions of the membrane and the seat as well as of the passage channels cross section can be chosen according to the consistency of the tube contents and be proportional for obtaining a suitable discharge speed. The closing device is self-closing and this action functions evenly and is very reliable. By means of the chosen construction of the membrane the closing device will be almost sensitive to the presence of foreign particles which in previous constructions of valves often put the valve out of order.

In the initial state of a filled tube the membrane beak is completely closed and thus, the tube is sealed. The tube is opened by cutting off the beak. It is advisable to shape the beak in such a way that it tapers conically towards its free end. The diameter of the discharge opening in the membrane at the beak may be determined by the position at which the beak is cut and according to the actual need. If the beak is cut off near the tip, the resistance against the pressing will be greater and the string pressed out will have a diameter which is smaller than when the beak is cut off closer to the seat. If desired, the beak can be cut in such a way that it is made suitable for being used for squirting, e.g., mayonnaise. If the tube is to contain oil, the beak should be shaped in such a way that it can be used for lubrication purposes.

The seat can be manufactured in one piece with the tube neck. However, according to a preferred embodiment the seat comprises a vault-shaped portion which together with the membrane can be clamped against the tube neck by means of an annular nut or a collar flange on the neck gripping over the base portion of the membrane. Such an arrangement facilitates inter alia the filling of tubes of the kind which have a basically flat shape.

Though the general shape of the membrane is conical it may be in many forms. The most suitable is probably the one in which the thickness of the membrane decreases from its periphery in the direction towards the base portion of the beak. A great elasticity but nevertheless the required stability at the attachment portion is obtained in the vicinity of this base portion by means of which the membrane normally is kept pressed against the seat portion situated radially inside the passage channels in the seat and thus there is obtained a good tightening effect, especially in case small firm particles should become stuck between the seat surface and the membrane.

Figure 2:
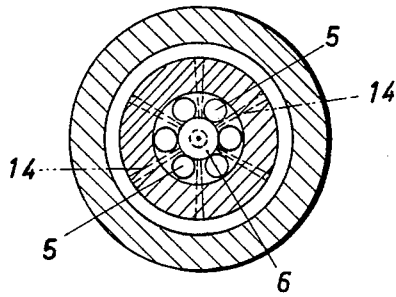
Figure 3:
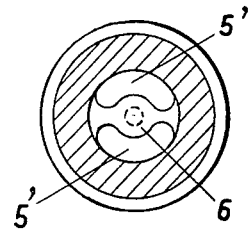
Figure 9:
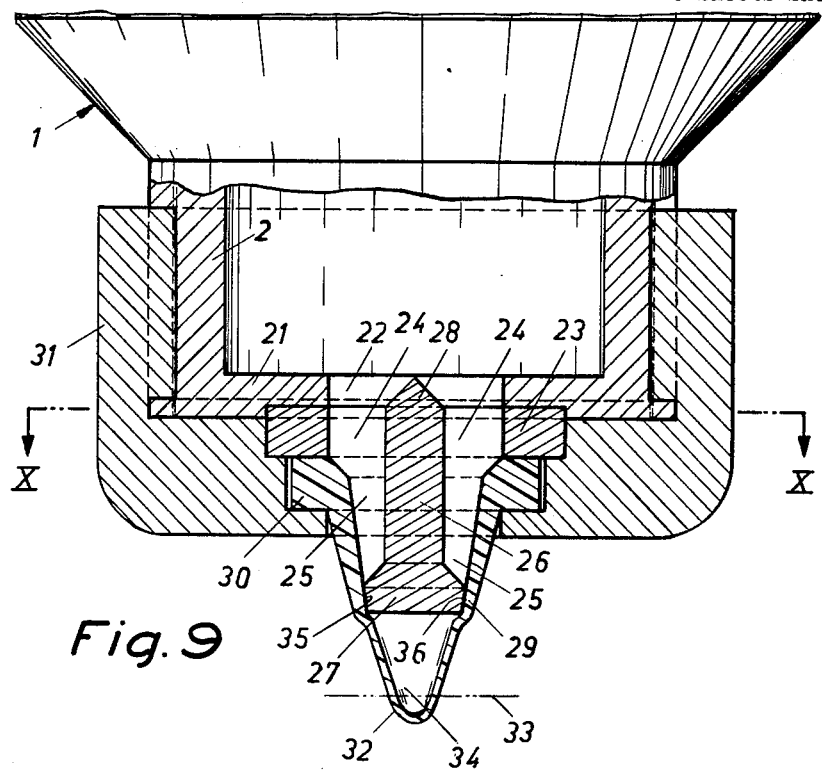
Figure 11:
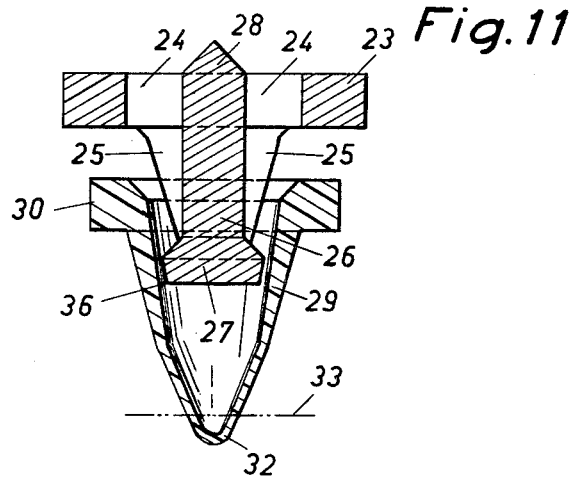
Figure 10:
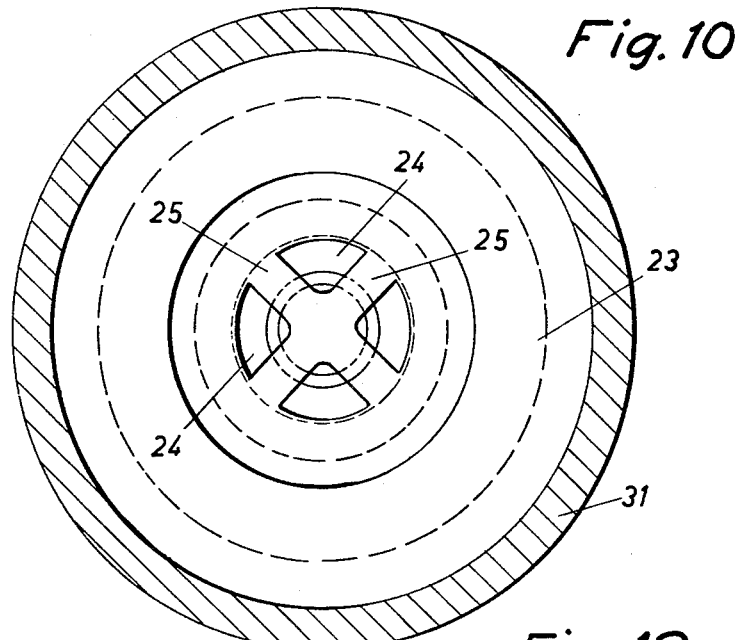
Figure 12:
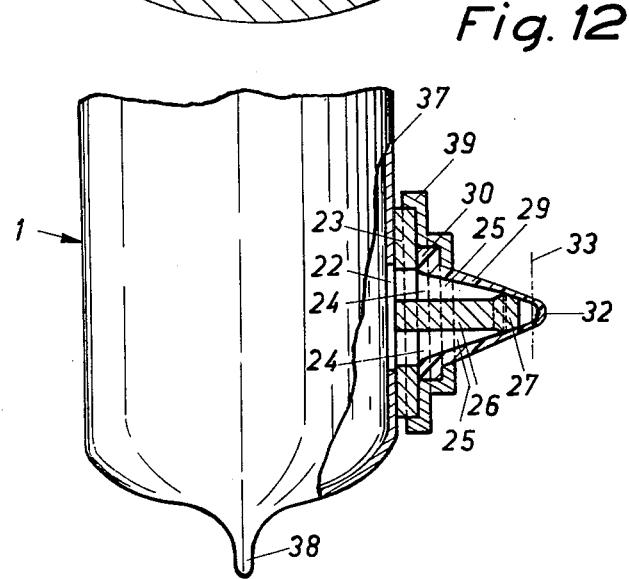

The invention will now be elucidated with reference to the accompanying, partly diagrammatical drawings. In the drawings:

FIG. 1 shows a longitudinal section through a tube manufactured in one piece with a seat and a closing device according to the invention, FIG. 2 shows a cross section through the closing device on the line II—II in FIG. 1, FIG. 3 shows a cross section through the seat with otherwise shaped passage channels, FIG. 4 shows a longitudinal section through a tube with a vault-shaped, loose seat with a membrane after removal of the connecting annular nut from the tube neck, FIG. 5 shows a longitudinal section through the seat and a membrane according to another embodiment of the invention, FIGS. 6–8 show longitudinal sections through the seat and the membrane according to further embodiments, FIG. 9 shows a longitudinal section through a tube with a seat which is removable from the tube neck, said seat having a membrane attached by means of a nut, FIG. 10 shows a cross section through the closing device on the line X—X in FIG. 9, FIG. 11 shows a longitudinal section through the tube seat after removal of the annular nut from the tube neck, and FIG. 12 shows a longitudinal section through a tube with a closing device having a clamping plate for clamping and tightening the membrane to the tube, e.g., by welding or soldering preferably directly to the tube wall.

Referring now to FIGS. 1 and 2, the illustrated embodiment is at the neck 2 of the tube 1 provided with a seat 4 extending transversely over the main discharge opening 3 of the tube. In the seat 4 there are proved passages 5 paralleling each other and being arranged in a circle around the central portion 6 of the seat 4. The passages 5 are on the outside of the seat 4 and are interconnected by means of a ring channel 7.

Axially outside the seat 4 there is arranged a membrane 8 of rubber or a similar elastic material. The membrane 8 which at its periphery is provided with a reinforcement ring flange 9 is kept by a ring nut 10 pressed against the outside of the seat 4. The membrane 8 is generally conical and provided with an outlet beak 11 with a cross section tapering in the direction towards the free end 12 of the beak, said end being hermetically closed until the contents of the tube are to be initially used.

The membrane which according to FIGS. 1 and 2 is provided with reinforcement ribs 14 radiating from its seat portion 13, is shaped in such a way that upon the tightening of the ring nut 10 the reinforcement ring flange 9 is clamped against a shoulder 15 on the outer end of the tube neck 2, the seat portion 13 is pressed against the central portion 6 of the seat 4 which gives an effective tightening. This is necessary also for preventing the membrane from becoming loosened when pressure is applied on the outside of the tube before the sealing has been opened. When the end 12 of the beak 11 has been cut off, e.g. at 16 (FIG. 1), a part of the tube contents is pressed out through the passages 5, into the ring channel 7 and, upon bending the annular zone 13 of the membrane 8 by the pressure outwards, out through the beak 11 and out through the open end of the same. As soon as the pressure against the tube 1 ceases, the membrane is returned by the elasticity of its material to closing position with the annular zone 13 pressed against the central portion 6 of the seat 4. Due to the reinforcement ribs 14 the membrane 8 returns quickly to closing position and these ribs give the membrane a greater stiffness closer to the beak base and more greatly tend to retain the membrane in closing position.

According to FIG. 2 the number of passages 5 has been chosen to be six. According to FIG. 3 the number of passages 5' is only two and they are here arc shaped.

As obvious from the lower part of FIG. 4 the seat 4' has been given the shape of a washer which together with the membrane 8', by means of the ring nut 10, can be tightened against the end surface 17 of the tube neck 2'. In this case, the membrane 8' has no reinforcement ribs 14 but is instead shaped in such a way that its thickness decreases from the reinforcement ring flange 9 more and more in the direction towards the annular zone 13. Also in this case the membrane 8' is given such dimensions that by the tightening of the ring nut 10 about the tube neck 2' the annular zone 13 of the membrane is forced against the central portion 6 of the seat 4'. Further, the seat 4' (like the seat 4 according to FIG. 1) has passages 5 and the outer ends of them are interconnected by means of an annular channel 7. The effect of this tube closing device is the same as the one described in the aforegoing with reference to the embodiment shown in FIGS. 1 and 2.

The embodiment of the seat 4" shown in FIG. 5 corresponds essentially to the embodiment shown in FIG. 1. However, the outside of the seat 4" has according to FIG. 5 been shaped as a segment of a sphere with the passages 5" situated on a somewhat larger distance from the central axis so that the central portion 6" has been given a somewhat bigger resting surface against the annular zone 13" of the membrane. In connection with very fluent tube contents the tightening effect of a tube closure shaped in this way will be a little more effective than in the embodiments described in the aforegoing.

According to the embodiments shown in FIGS. 6–8, the seat 4 has been shaped in one piece with the nut 10 to be screwed on the tube neck 2. The outside of the seat 4 is provided with a peripheral notch 18. The seat 4 protrudes with a border 19 into this notch and the reinforcement ring flange 9 of the membrane 8 is adapted resiliently to engage the notch 18 and to be retained in the same by the border 19 simultaneously as the seat portion 13 is pressed against the central portion 6 of the seat 4 radially inside the passages 5. The reinforcement ring flange 9 engages so tightly in the notch 18 that the membrane is retained at the seat 4 even when the annular zone 13, by the pressure of the extruded tube contents, is bent out from the seat portion 6 and also in case a pressure is applied on the tube before the cutting of the beak.

In the embodiment shown in FIGS. 7 and 8 it is supposed that the seat 4 and the nut 10 are manufactured in one piece of metal or plastics. The nut is in this case provided with a downwards directed flange 20 which— as shown in FIG. 8—is flanged over the peripheral border portion, i.e. the base portion of the membrane 8 at the side of the reinforcement ring flange 9 when the membrane has been located in front of the seat 4. Due to the flange 20 there is obtained further security so that the reinforcement ring flange 9 of the membrane 8 will with safety retain the membrane against the seat at the extrusion of the tube contents.

When the nut 10 and the seat 4 comprise plastics, the flange 20 after the casting should have the position shown in FIG. 8. At the mounting of the membrane 8 the flange 20 may, against the action of the resiliency of the material, first be bent out so as to make it possible to insert the base portion of the membrane 8 with the reinforcement ring flange 9 into the notch 18 in the seat 4. The flange may be replaced by a number of resilient tongues flanging over the base portion of the membrane 8 in a corresponding way.

In the embodiment shown in FIGS. 9–11 the neck 2 of the tube 1 has an end wall 21 provided with a central discharge opening 22 for the tube contents. Across this opening there extends an annular seat 23 with a number of (according to FIG. 10, four) passage channels 24 separated from each other by means of partitions 25 extending radially from a piston-shaped central portion 26 with a double-conical seat head 27 at its outer end. At the opposite end the central portion 26 ends as a point 28 in the opening 22. Due to this shaping of the central portion 26 of the seat the resistance during the extrusion of the tube content is reduced to a minimum.

On the seat head 27 there is a sock-like membrane 29 of rubber, soft plastics or another suitable elastic material extending up along the partitions 25. At one end the membrane 29 is provided a reinforcement ring flange 30 which by means of a clamping nut 31 on the tube neck 2 is held resiliently against the annular seat 23 radially outside the passages 24. At the opposite end, which may have the shape of a beak 32, the membrane 29 is closed but may before use be cut off, say on the cutting line 33, so that a discharge opening 34 is formed at this place. The thickness of the wall of the membrane 29 increases continuously from the annular zone 35, i.e. the place where the membrane 29 rests against the conical surface 36 of the seat head 27, to the reinforcement ring flange 30. Hereby, there is obtained not only a good stability of the attachment portion, i.e. the base portion, of the membrane but also a good elasticity of the annular zone 13 of the membrane simultaneously so the tightening pressure against the conical surface 36 will be sufficient for preventing the contents of the tube from exuding therefrom under the influence of gravity.

On the other hand, when the wall of the tube 1 is exposed to a slight pressure, a measured quantity of the tube contents is pressed through the passages 24 out through the beak 32 because the membrane 29, due to the occurring internal pressure, is expanded in front of the seat head 27 where temporarily there is created an annular slot. As soon as the pressure against the tube wall ceases, the membrane 29 again resiliently engages against the seat head 27.

In the embodiment shown in FIG. 12 the tube 1 is supposed to be manufactured from a tube billet, preferably comprising soft plastics. In the tube wall there is in the vicinity of one end 38 of the tube provided a discharge opening 22. On the outside of the tube wall 37 there is in front of the opening 22 attached, preferably by means of welding or glueing, a ring seat 23 with a central portion 26 shaped as a piston and provided with passages 24 defined by partitions 25 and a seat head 27. Thus, the seat corresponds essentially to the one shown in FIGS. 9–11. On the seat head 27 there is put a membrane 29 the reinforcement ring flange 30 of which by means of a clamping ring or plate 39 is tightening pressed against the ring seat 23. The clamping plate 39 is attached to the ring seat 23 by means of glueing or welding. Also in this case the outer end of the beak 32 of the membrane 29 is intended to be cut off, e.g. along the cutting line 33, when the tube is to be used.

The present invention has been described above in detail for purposes of illustration only and is not intended to be limited by this description or otherwise except as defined in the appended claims. The embodiment described in the aforegoing are thus to be regarded only as examples and the tube as well as the closure may be constructively modified in many ways. The seat 23 and the central portion 26 with the seat head 27 and the partitions may be shaped in one single piece with the tube breast or the tube neck 2 or be adapted to be arranged fixedly on the tube neck. In the last mentioned case it is preferable to bend an annular flange extending axially from the tube neck over the membrane base portion and the seat body so that these two portions thereupon are unreleasably retained at the tube neck. The material in the tube and the details of the closure device are independent of the invention. The discharge beak on the membrane may internally be provided with longitudinally extending ribs or be shaped in such a way that it can be used for squirting purposes, e.g., for squirting mayonnaise and other creamy products. When the base portion of the membrane is retained or clamped by an annular nut, this should be adapted to be sealed after the filling of the tube. Such a sealing may be obtained by a deformation of the rear border of the ring nut by means of say heat in such a way that in case the material comprises plastics it engages behind an annular border on the tube neck and thus thereupon cannot be loosened. It is of importance for the good stiffening effect of the membrane that the seat is circular.

The beak may be cut in a longitudinal direction instead of in transverse direction so as to render possible an extrusion of the contents of the container.

What I claim is:

1. A closure device for a collapsible tube having a discharge portion provided with a round mouth, said device comprising an elongated round seat member fluidtight on the discharge portion and axially alined with the mouth of the tube and having a solid projection of circular cross section at the outer end portion thereof and projecting from the tube, the seat member having a circular base portion disposed on the discharge portion coaxial with the mouth, the seat member having a plurality of passageways uniformly angularly and radially spaced with respect to the axis of the projection between the base portion and axis for communication between the mouth of the discharge portion and the zone at the periphery of the projection where the latter is of circular cross section, and a somewhat generally conically shaped elastic membrane having a reenforcing peripheral mounting portion secured fluidtight on the base portion of the seat member and resiliently engaging on the projection completely therearound at the zone of the circular cross section to seal off said passageways from the atmosphere, the membrane terminating in a beak axially outer from the end of the projection and adapted to be transversely cut off, the material of the membrane being thin near the tip of the beak.

2. A device as claimed in claim 1, said seat member having an outwardly tapered frusto-conical surface adjacent said passageways and on which the membrane engages along the direction of said axis and continuously thereabout to provide a substantially uniform peripheral surface of contact, said membrane being free to be resiliently forced from engagement with said surface when contents of the tube are being forced through said passageways so that when pressure on the tube ceases, radial component forces of the stretched membrane will urge contents between said surface and the membrane outwardly toward the beak.

3. In combination with a collapsible tube having a discharge portion provided with a round opening therein, a generally frusto-conical seat member in the nature of a false cap having a peripheral base flange secured on the discharge portion and coaxial with the opening, the member tapering from the tube to form a projecting central part, having a zone of circular cross-section, the member being provided with a plurality of passageways radially outer of said zone and parallel with the axis of the seat member and about said axis for communication from said mouth to said zone of said part, and an elastic membrane of generally conical shape secured substantially fluidtight on said flange and fitting snugly on the seat member and resiliently engaging on said central part at the zone of circular cross section to seal off said passage ways from the space within the membrane and axially outer from the part.

4. In a combination as claimed in claim 3, said membrane terminating in a beak adapted to be transversely cut off near the end thereof to allow contents within the beak to discharge.

5. In a combination as claimed in claim 4 said membrane being of decreasing thickness from said flange at least to the zone of circular cross section.

6. In a combination as claimed in claim 5, said passageways being in the form of outwardly open radial channels parallel with the axis of the seat member and between the peripheral base flange and said zone of circular cross section leaving radial fins separating the respective channels.

7. In a combination as claimed in claim 4, said passageways being bores.

8. In a combination as claimed in claim 4, said membrane being provided with radial ribs extending from the flange at least to the beak.

References Cited by the Examiner

UNITED STATES PATENTS

| 1,051,554 | 1/13 | Champion | 222—490 X |
| 2,208,201 | 7/40 | Smith | 222—494 |
| 2,546,709 | 3/51 | Abarr | 222—490 X |
| 2,591,354 | 4/52 | Harris | 222—494 X |
| 2,981,449 | 4/61 | Perkins | 222—541 |

FOREIGN PATENTS 109,109   11/39   Australia.

LOUIS J. DEMBO, *Primary Examiner.*

HADD S. LANE, *Examiner.*